US011148980B2

(12) United States Patent
Smyth

(10) Patent No.: US 11,148,980 B2
(45) Date of Patent: *Oct. 19, 2021

(54) PROTECTIVE COATING FOR CERAMIC MATRIX COMPOSITES

(71) Applicant: Raytheon Technologies Corporation, Farmington, CT (US)

(72) Inventor: Imelda P. Smyth, North Palm Beach, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,488

(22) Filed: Jul. 18, 2019

(65) Prior Publication Data
US 2020/0055789 A1    Feb. 20, 2020

Related U.S. Application Data

(60) Provisional application No. 62/764,906, filed on Aug. 16, 2018.

(51) Int. Cl.
| C04B 41/50 | (2006.01) |
| C04B 35/565 | (2006.01) |
| C04B 41/45 | (2006.01) |
| C04B 41/85 | (2006.01) |

(52) U.S. Cl.
CPC ............ *C04B 41/85* (2013.01); *C04B 35/565* (2013.01); *C04B 41/4503* (2013.01); *C04B 41/4543* (2013.01); *C04B 41/5024* (2013.01); *C04B 41/5042* (2013.01); *C04B 41/5059* (2013.01); *C04B 2237/348* (2013.01); *C04B 2237/365* (2013.01); *C04B 2237/704* (2013.01)

(58) Field of Classification Search
None
See application file for complete search history.

(56) References Cited

U.S. PATENT DOCUMENTS

| 2011/0219775 A1 | 9/2011 | Jarmon et al. | |
| 2012/0236899 A1* | 9/2012 | Subramanian | ......... G01K 1/026 374/1 |
| 2012/0308836 A1* | 12/2012 | Sheedy | .................. C04B 41/52 428/446 |
| 2014/0011318 A1 | 1/2014 | Massimi et al. | |
| 2016/0215645 A1 | 7/2016 | McCaffrey | |

(Continued)

FOREIGN PATENT DOCUMENTS

| JP | 2006143553 A | * | 6/2006 |
| JP | 2006143553 A | | 8/2006 |
| JP | 2008308374 A | * | 12/2008 |

OTHER PUBLICATIONS

European Office Action dated Oct. 14, 2020 for European Patent Application No. 19191003.3.

(Continued)

*Primary Examiner* — David Sample
(74) *Attorney, Agent, or Firm* — Bachman & LaPointe, P.C.

(57) ABSTRACT

An article has a substrate and a layer atop the substrate. The layer has: a matrix comprising at least one of hafnium silicate ($HfSiO_4$) and ytterbium disilicate ($Yb_2Si_2O_7$); and barium magnesium alumino silicate (BMAS).

20 Claims, 7 Drawing Sheets

(56) References Cited

U.S. PATENT DOCUMENTS

2016/0281513 A1  9/2016  Kirby
2016/0332922 A1  11/2016 Tang et al.
2017/0350268 A1  12/2017 McCaffrey

OTHER PUBLICATIONS

European Search Report dated Dec. 17, 2019 for European Patent Application No. 19191003.3.
Spray Shaping Systems, Precise Control with Patented Spray Shaping Systems, Jul. 11, 2018, Sono-Tek Corporation, Milton, New York.
Material Product Data Sheet, Ytterbium Disilicate Powder for Thermal Spray, Jan. 13, 2017, Oerlikon Metco, Westbury, NY.
European Search Report dated Dec. 17, 2019 for European Patent Application No. 19192116.2.

* cited by examiner

PROTECTIVE COATING FOR CERAMIC MATRIX COMPOSITES

CROSS-REFERENCE TO RELATED APPLICATION

Benefit is claimed of U.S. Patent Application No. 62/764,906, filed Aug. 16, 2018, and entitled "Protective Coating for Ceramic Matrix Composites", the disclosure of which is incorporated by reference herein in its entirety as if set forth at length.

BACKGROUND

The disclosure relates to ceramic matrix composite (CMC) components. More particularly, the disclosure relates to coatings for CMC components.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other loads.

The compressor and turbine sections of a gas turbine engine include alternating rows of rotating blades and stationary vanes. The turbine blades rotate and extract energy from the hot combustion gases that are communicated through the gas turbine engine. The turbine vanes direct the hot combustion gases at a preferred angle of entry into a downstream row of blades. An engine case of an engine static structure may include one or more blade outer air seals (BOAS), which are typically formed of metal, that establish an outer radial flow path boundary for channeling the hot combustion gases.

United States Patent Application Publication 20170350268 A1 (the '268 publication), of McCaffrey, published Dec. 7, 2017, discloses a ceramic matrix composite blade outer air seal segment. The disclosure of the '268 publication is incorporated by reference in its entirety herein as if set forth at length.

United States Patent Application Publication 20160215645 A1 (the '645 publication), of McCaffrey, published Jul. 28, 2016, discloses a ceramic matrix composite blade outer air seal segment. The disclosure of the '645 publication is incorporated by reference in its entirety herein as if set forth at length.

United States Patent Application Publication 20110219775 A1 (the '775 publication), of Jarmon, et al., published Sep. 15, 2011, discloses ceramic matrix composite materials with a sprayed hard coating. The disclosure of the '775 publication is incorporated by reference in its entirety herein as if set forth at length.

United States Patent Application Publication 20160332922 A1 (the '933 publication), of Tang et al., published Nov. 17, 2016, discloses a coating for CMC comprising SiOC, BMAS, and $SiO_2$. Application is as a slurry. The disclosure of the '922 publication is incorporated by reference in its entirety herein as if set forth at length.

SUMMARY

One aspect of the disclosure involves an article comprising: a substrate; and a layer atop the substrate. The layer comprises: a matrix comprising at least one of hafnium silicate ($HfSiO_4$) and ytterbium disilicate ($Yb_2Si_2O_7$); and barium magnesium alumino silicate (BMAS).

A further embodiment of any of the foregoing embodiments may additionally and/or alternatively include the substrate comprising a ceramic matrix composite.

A further embodiment of any of the foregoing embodiments may additionally and/or alternatively include the ceramic matrix composite being a SiC/SiC ceramic matrix composite.

A further embodiment of any of the foregoing embodiments may additionally and/or alternatively include the article being a blade outer airseal.

A further embodiment of any of the foregoing embodiments may additionally and/or alternatively include the layer being directly atop the substrate.

A further embodiment of any of the foregoing embodiments may additionally and/or alternatively include the layer being an outermost layer.

A further embodiment of any of the foregoing embodiments may additionally and/or alternatively include the layer being an intermediate layer between the substrate and a ceramic layer.

A further embodiment of any of the foregoing embodiments may additionally and/or alternatively include the layer having a thickness of 0.05 mm to 0.50 mm.

A further embodiment of any of the foregoing embodiments may additionally and/or alternatively include the layer covering an area of at least 4.0 $cm^2$.

A further embodiment of any of the foregoing embodiments may additionally and/or alternatively include the layer adhering an object to the substrate.

A further embodiment of any of the foregoing embodiments may additionally and/or alternatively include the object being a thermocouple.

A further embodiment of any of the foregoing embodiments may additionally and/or alternatively include the layer having a BMAS concentration of 0.8% to 10.0% by weight.

A further embodiment of any of the foregoing embodiments may additionally and/or alternatively include a gas turbine engine including the article.

A further embodiment of any of the foregoing embodiments may additionally and/or alternatively include the gas turbine engine wherein the article is a blade outer air seal.

A further embodiment of any of the foregoing embodiments may additionally and/or alternatively include a method for using the article, the method comprising: exposing the article to a calcium magnesium aluminosilicate (CMAS)-forming environment.

Another aspect of the disclosure involves a method for coating a substrate, the method comprises: applying a combination of: at least one of hafnium oxide ($HfO_2$) and ytterbium oxide ($Yb_2O_3$); silicon carbide (SiC); and barium magnesium aluminosilicate (BMAS). The combination is then heated.

A further embodiment of any of the foregoing embodiments may additionally and/or alternatively include the applying being of one or more slurries.

A further embodiment of any of the foregoing embodiments may additionally and/or alternatively include a weight content of the BMAS relative to total combined $HfO_2$, $Yb_2O_3$, SiC, and BMAS in the one or more slurries being 0.8% to 10.0%.

A further embodiment of any of the foregoing embodiments may additionally and/or alternatively include the applying being via ultrasonic spray.

A further embodiment of any of the foregoing embodiments may additionally and/or alternatively include the heating being in an oxidizing environment and the heating being to a peak temperature of at least 1450° C.

The details of one or more embodiments are set forth in the accompanying drawings and the description below. Other features, objects, and advantages will be apparent from the description and drawings, and from the claims.

BRIEF DESCRIPTION OF THE DRAWINGS

The drawings can be briefly described as follows.

Like reference numbers and designations in the various drawings indicate like elements.

DETAILED DESCRIPTION

Examples are given below of the use of a material comprising a small amount of barium magnesium aluminosilicate (BMAS) in hafnium silicate ($HfSiO_4$) and/or ytterbium disilicate ($Yb_2Si_2O_7$) (hereafter the "BMAS-containing material") as a coating on a CMC (e.g., SiC/SiC). Particular illustrations involve three specific uses and locations on a blade outer airseal (BOAS) segment whose configuration is drawn from the '268 publication. Nevertheless, use may be in other locations and ways on a BOAS segment, on different BOAS segments, and on articles other than BOAS segments (e.g., CMC blades, combustor panels, and the like). The material may serve various purposes such as smoothing a rough CMC, acting as a wear coating, acting as a bond coating, acting as an adhesive or cement, acting as a filler, and the like.

Figure 1:
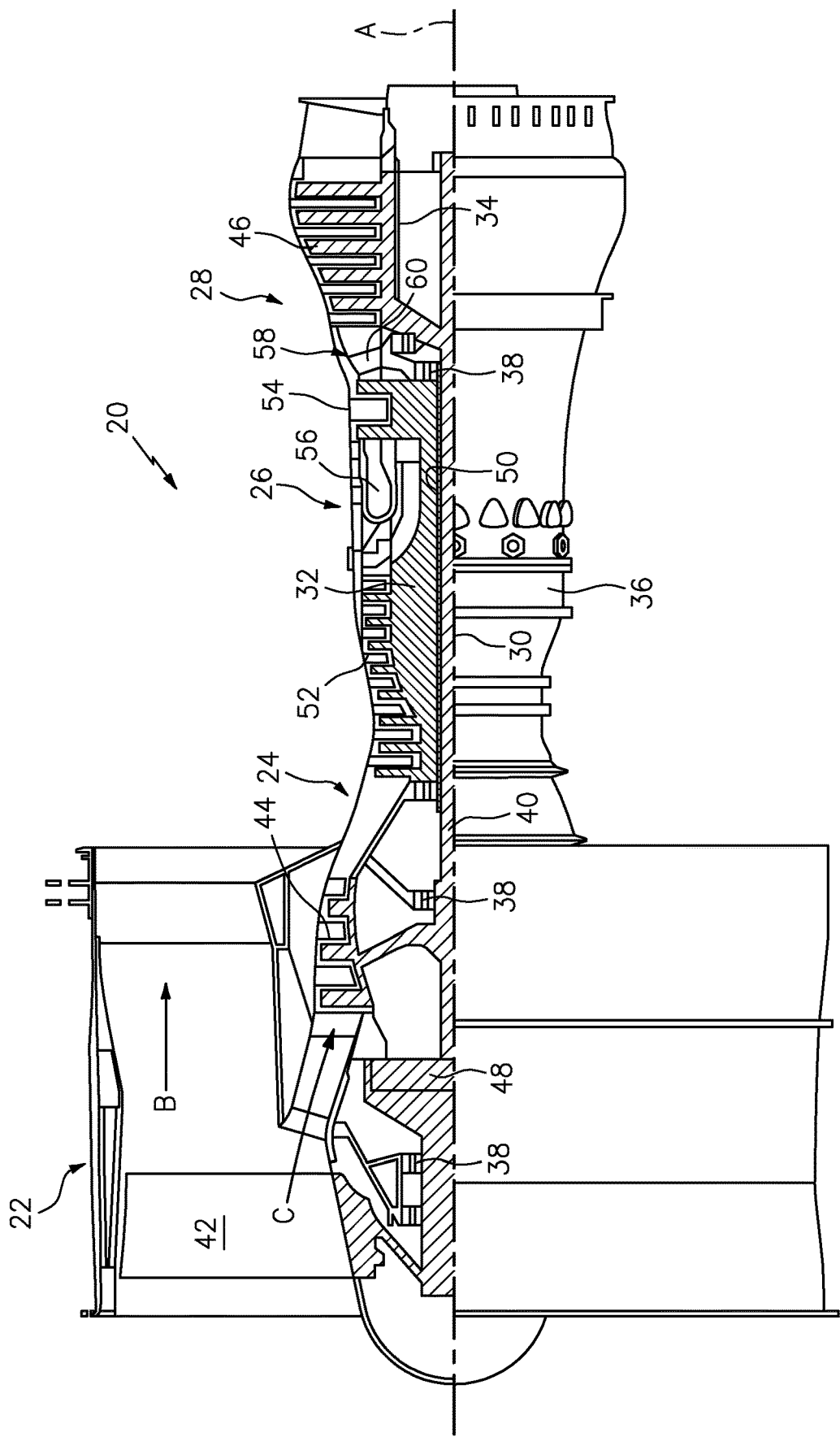
FIG. 1 is a schematic, cross-sectional view of a gas turbine engine.

FIG. 1 schematically and non limitingly illustrates a gas turbine engine 20 that includes a fan section 22, a compressor section 24, a combustor section 26, and a turbine section 28. The exemplary illustrated engine is a two spool engine as discussed below. Alternative engines might include an augmenter section (not shown) among other systems or features. The fan section 22 drives air along a bypass flow path B while the fan section and compressor section 24 drive a core airflow in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The concepts disclosed herein can further be applied outside of gas turbine engines.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

Figure 2:
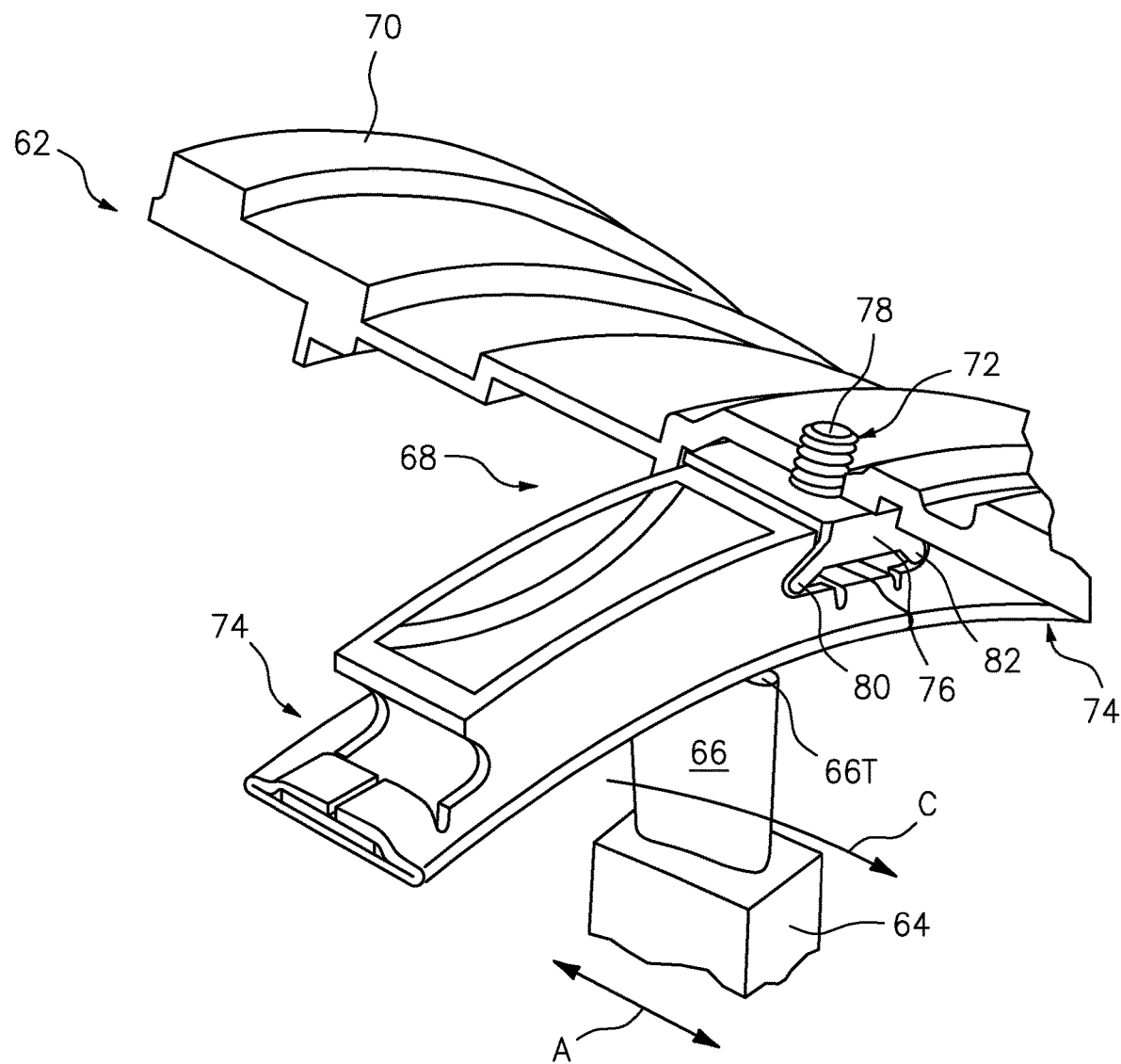
FIG. 2 is a partial view of the engine of FIG. 1.

FIG. 2 is a perspective view of a portion 62 of the gas turbine engine 20 of FIG. 1. In this embodiment, the portion 62 is a portion of the high pressure turbine 54. It should be understood, however, that other portions of the gas turbine engine 20 may benefit from the teachings of this disclosure, including but not limited to the fan section 22, the compressor section 24, and the low pressure turbine 46.

In this embodiment, a rotor disk 64 (only one shown, although multiple disks could be axially disposed within the portion 62) is configured to rotate about the engine central longitudinal axis A. The portion 62 includes an array of rotating blades 66 (only one shown), which are mounted to the rotor disk 64, and arrays of static vane assemblies (not shown) on axial sides of the blades 66.

Each blade 66 includes a blade tip 66T at a radially outermost portion thereof. The rotor disk 64 is arranged such that the blade tips 66T are located adjacent a blade outer air seal (BOAS) assembly 68. The BOAS assembly 68 may find beneficial use in many industries including aerospace, industrial, electricity generation, naval propulsion, pumps for gas in oil transmission, aircraft propulsion, vehicle engines and stationary power plants.

The BOAS assembly 68 is disposed in an annulus radially between an engine case (such as an outer casing 70 of the engine 20) and the blade tips 66T. The BOAS assembly 68 includes a support structure 72 and a plurality of BOAS segments 74. The BOAS segments 74 may be arranged to form a segmented full ring hoop assembly that circumferentially surrounds the associated blades 66, which provides a sealing surface for the blade tips 66T to prevent leakage of the core airflow over to the blades 66. For ease of reference, the individual BOAS segments 74 may be referred to individually as a "BOAS segment" or simply a "BOAS."

Figure 3:
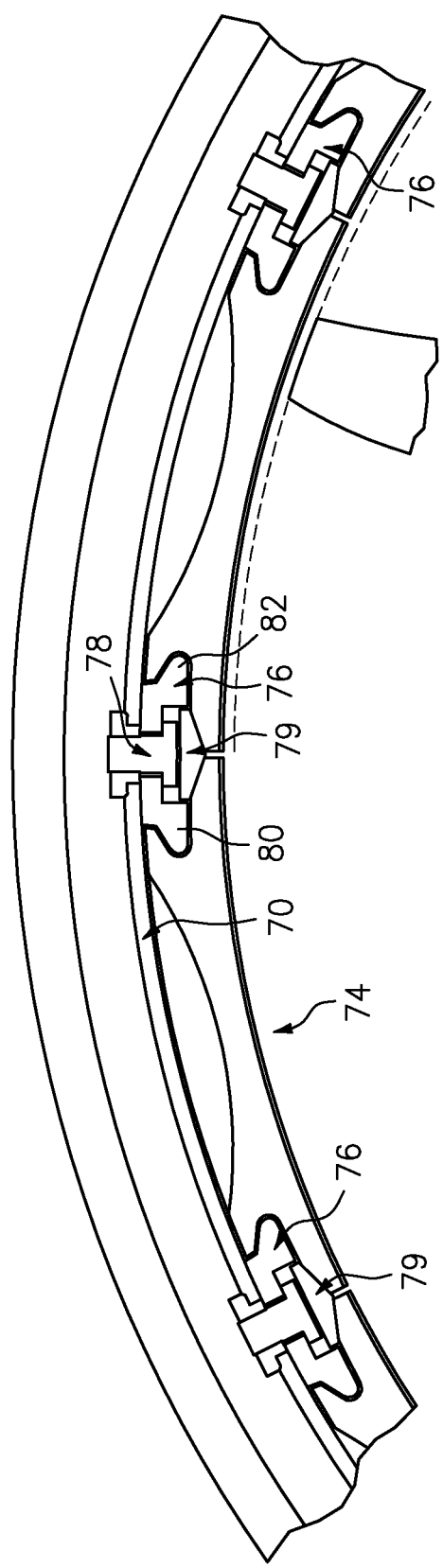
FIG. 3 is a partial longitudinal cutaway view of the engine.
Figure 3A:
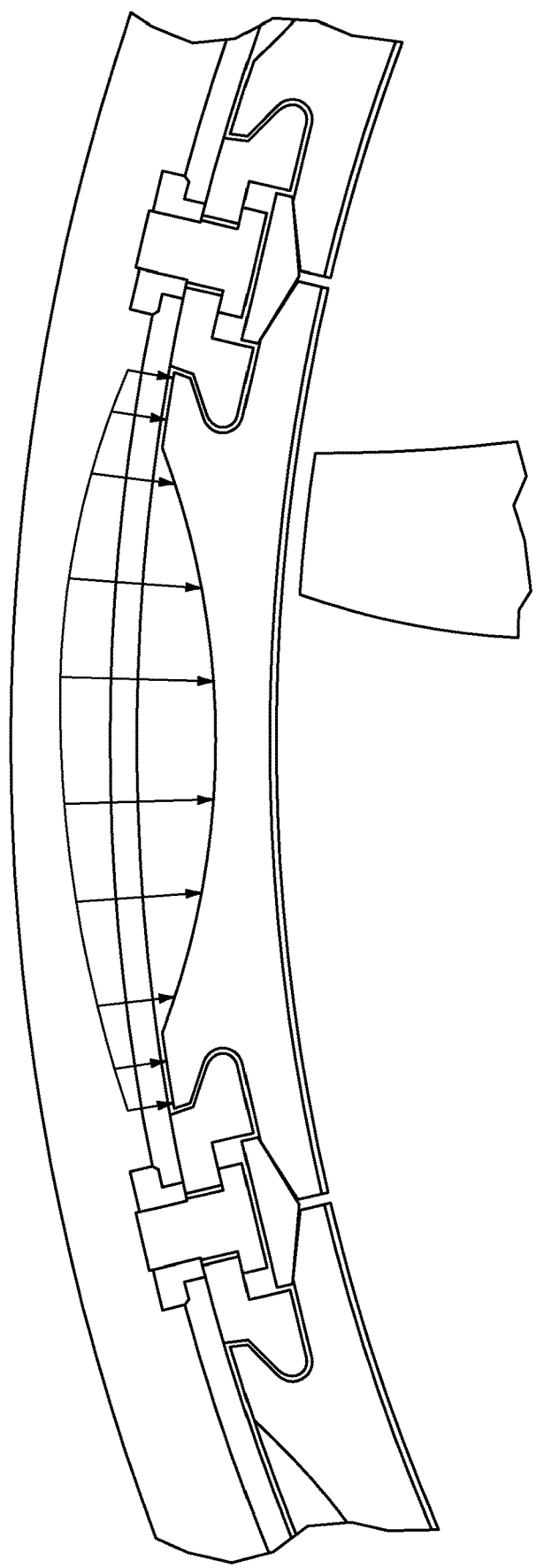
FIG. 3A is an enlarged view of the engine of FIG. 3.

In this example, the support structure 72 includes a retention block 76 fastened to the engine outer casing 70 by a fastener 78. The retention block 76 includes tapered arms 80, 82 on circumferentially opposed sides thereof. The tapered arms 80, 82 in this example are rounded, and are to be received within a corresponding curved end of a respective BOAS segment 74 (as will be explained below). FIG. 3 also shows a wedge seal 79 sealing the inter segment gap and retained in a compartment in the inner diameter (ID) face of the retention block 76.

Figure 4:
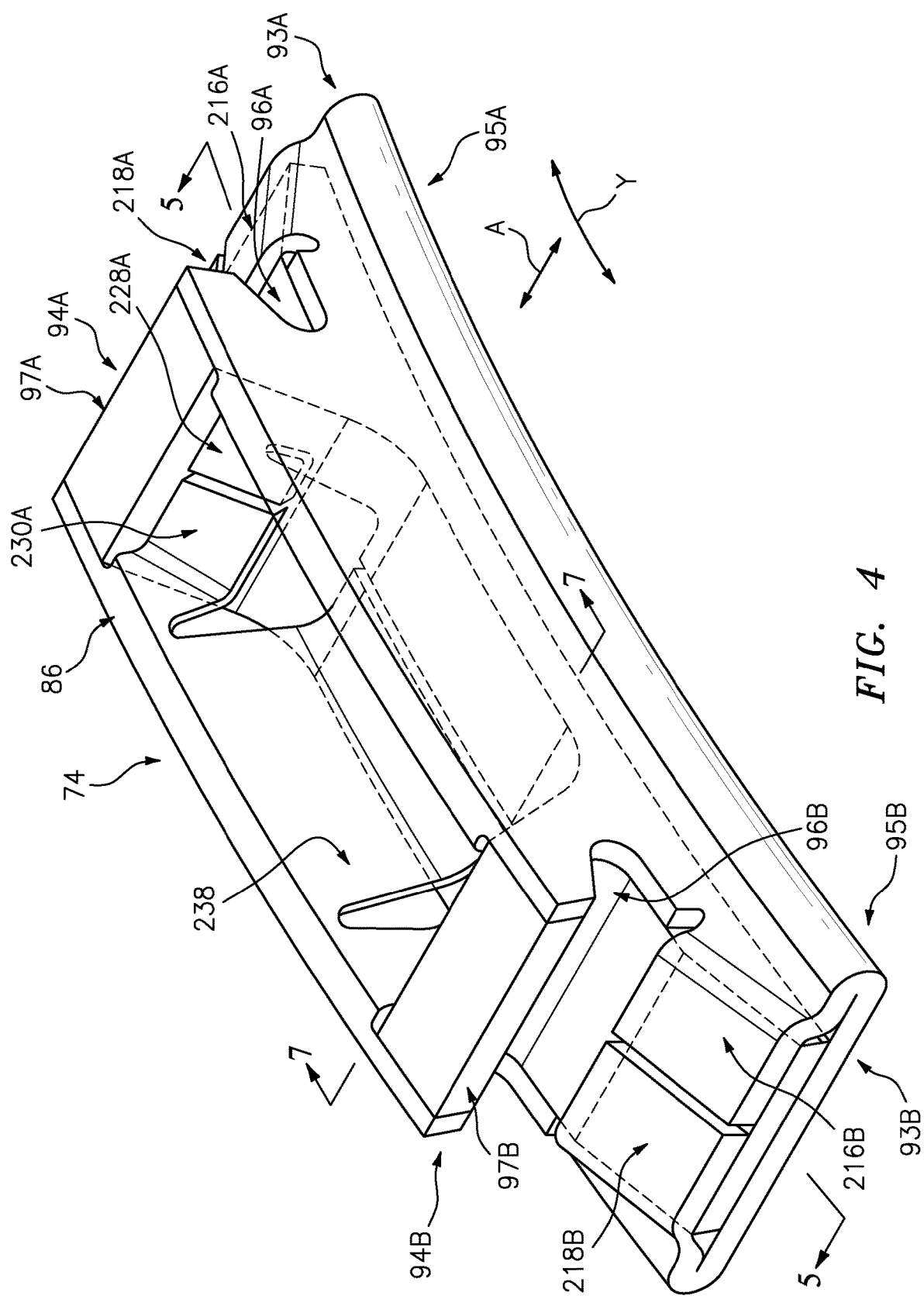
FIG. 4 is a perspective view of a blade outer airseal (BOAS) segment.
Figure 5:
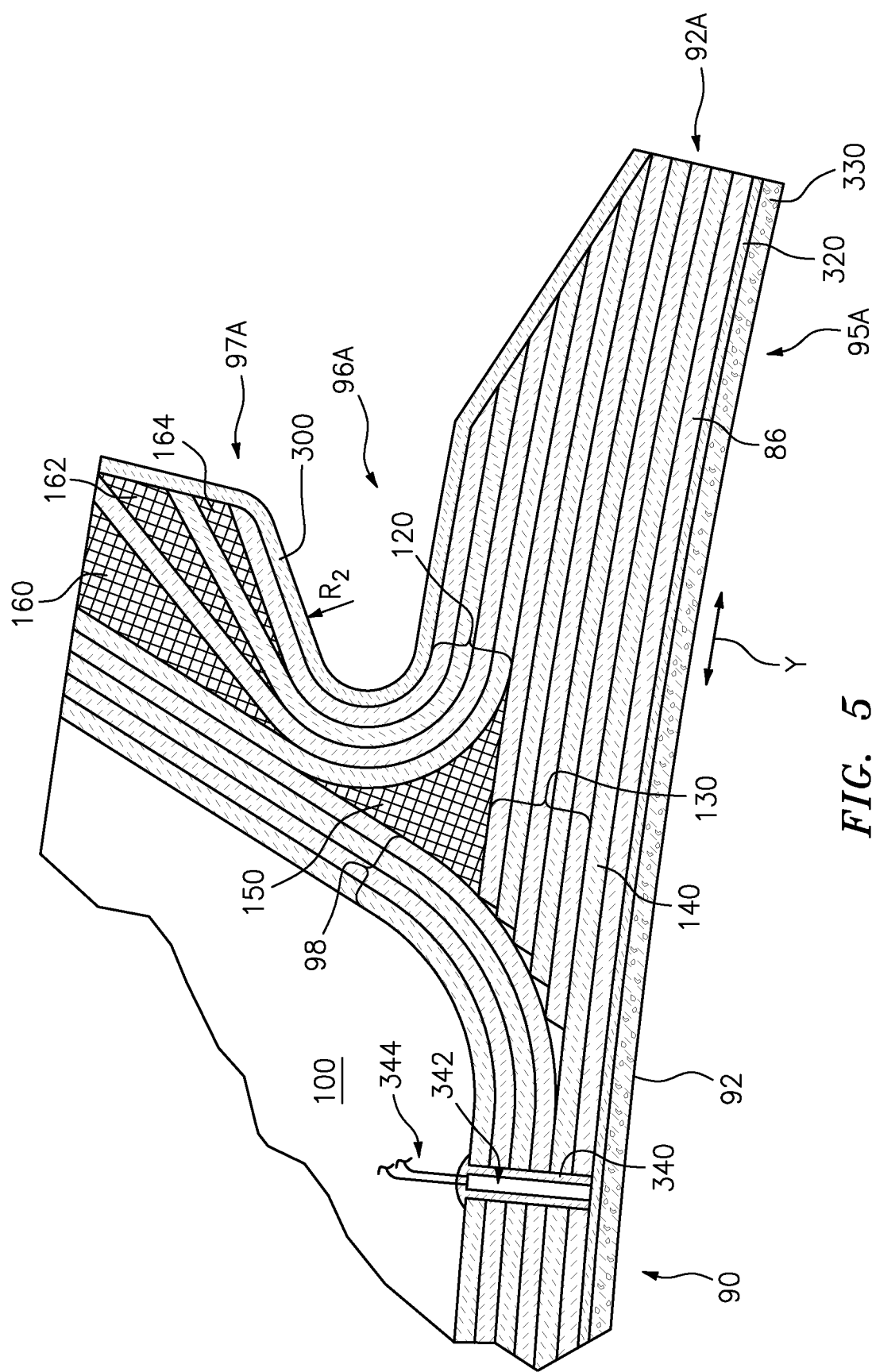
FIG. 5 is a partial transverse (engine frame of reference) sectional view of the BOAS segment taken along line 5-5 of FIG. 4.

FIG. 4 illustrates the detail of an example of a BOAS segment 74. In this example, the BOAS segment 74 is primarily made of a ceramic matrix composite (CMC) material. As with the '645 and '268 publications, the BOAS segment 74 may include some non-CMC materials, such as for the fillers or spacers, discussed below. CMC materials include a ceramic matrix and a plurality of fibers suspended in that ceramic matrix. The fibers can be a ceramic fibers, silicon carbide fibers, carbon fibers, or metallic fibers, as examples. As is discussed further below, additional fillers may be added beyond those of the '645 publication in order to reorient plies/layers of the CMC to better resist fracture as in the '268 publication. With reference to FIG. 5, the circumferential direction Y is normal to the engine central longitudinal axis A.

Figure 6:
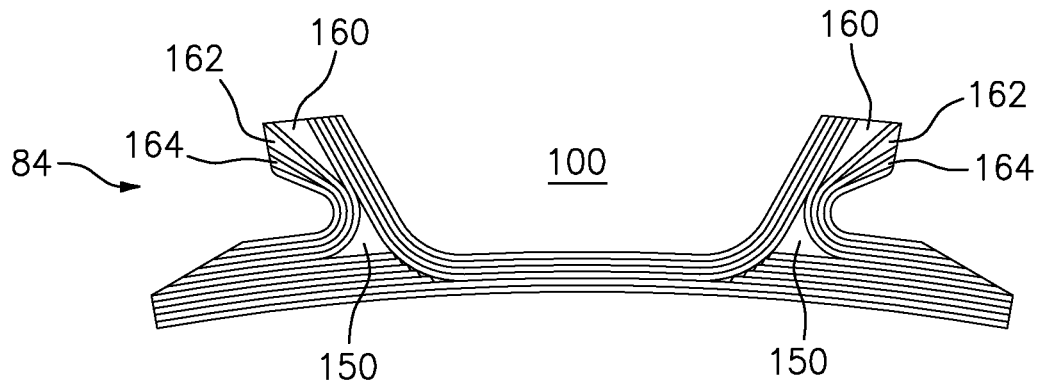
FIG. 6 is view of a base or core structure of the BOAS segment of FIG. 5.
Figure 7:
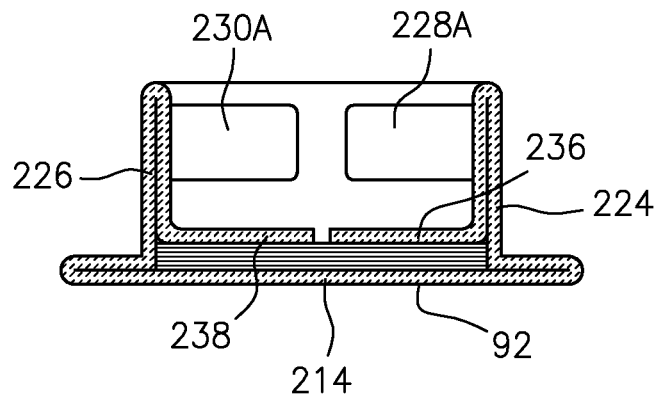
FIG. 7 is a longitudinal (engine frame of reference) sectional view of the BOAS segment taken along line 7-7 of FIG. 4.
Figure 8:
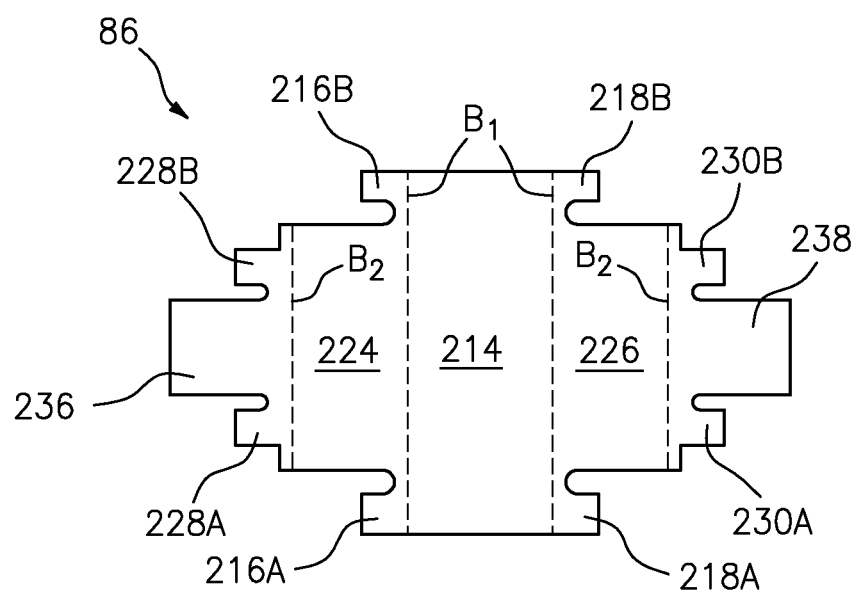
FIG. 8 is a plan view of an overwrap layer of the BOAS segment.

The exemplary BOAS segment 74 includes a base structure or core 84 (FIG. 6) and an overwrap layer 86 (FIGS. 5 and 8). The detail of the base structure 84 is perhaps best seen with reference to FIG. 5, which is a cross-sectional view taken along lines 5-5 in FIG. 4. For ease of reference, FIG. 6 does not include the overwrap layer 86.

The BOAS segment 74 has a main body portion 90 having an inner diameter (ID) surface 92 and extending between a first circumferential end 93A and a second circumferential end 93B (FIG. 4). The BOAS segment further comprises a pair of mounting ears 94A and 94B radially outward of the main body 90 and separated from adjacent main body end portions 95A, 95B by associated longitudinal channels (also referred to as recesses or slots) 96A, 96B circumferentially outwardly open. The mounting ears have respective circumferentially outboard ends 97A, 97B. Thus, the mounting ears and the respective adjacent main body end portions cooperate to define the respective recesses.

The base structure 84 comprises a number of groups of plies. One group 98 of plies may form a bridge extending centrally along the main body and then outward along the mounting ears to leave a central channel, well, or recess 100 radially outwardly open.

Another group 120 of plies extends along the mounting ear circumferentially outboard of adjacent portions of the plies 98 and along the main body portion 95A or 95B thus bending around an arc to form the associated recess 96A or 96B. Accordingly, respective groups 120 may be at opposite circumferential ends of the structure 84.

Similarly, groups 130 of plies may build thickness of the associated portion 95A or 95B terminating adjacent the bend of the group 98. In the exemplary embodiment, additionally, one or more plies 140 extend essentially full circumferential span radially inward of the groups 98 and 130 and thus generally parallel to the surface 92.

FIG. 5 further shows a filler or spacer 150 similar to that of the '645 and '268 publication filling a gap at the bend of the group 120.

FIG. 5 also shows several further modifications relative to the '645 publication. A first '268 publication modification involves the use of wedges 160, 162, 164 to fan out the plies along the mounting ears. The exemplary wedges are positioned between plies of the group 120; however the wedges may also be within the group 98. The wedges may be used to orient the plies to maximally resist loads that would otherwise cause cracking. Wedge materials may be similar to those of the wedge/spacer 150. For example, the wedges may be made of a CMC. In one group of examples, these are initially formed as a mix of ceramic fibers and a ceramic-precursor resin material (e.g., molded). This molded material in a green state may be laid up with the plies or their precursors (fully or partially processed/cured CMC). In other examples, the wedges may be made of a monolithic ceramic or a fully processed CMC material.

Exemplary individual wedges have peak thickness of at least 0.15 mm, more specifically 0.15 mm to 5.0 mm, more specifically, 0.30 mm to 3.0 mm. The individual wedges may have an included angle of 2.0° to 15.0°, more specifically 4.0° to 12.0° Depending on the particular implementation, the wedges may fan the plies by a net angle of at least 15.0°, more specifically 15° to 70°, more specifically 20° to 55° or 35° to 50°. In a reengineering of a baseline BOAS segment this may be effective to reorient the side surface of the well 100 (formed by the group 98) by that same angle. Such reengineering may bring the side surface close to radial (e.g., within 20°, more specifically within 10°, or within 5° Likely, it will be at least 2° off radial to allow radial extraction of the tool (e.g., functioning as a mandrel to form the well).

A second modification involves the load distributing member of the '268 publication. That member may be covered by or replaced by a layer of the BMAS-containing material. FIG. 5 shows such a layer 300 atop the outermost ply of the group 120 along the outboard surface of the recess 96A, 96B. The layer 300 interfaces with the retention block and helps to provide wear resistance and distribute loads. The exemplary layer 300 is formed in situ as a coating. An exemplary thickness is 0.05 mm to 0.50 mm, more specifically, 0.07 mm to 0.15 mm at least locally/peak, optionally feathering or tapering out. Exemplary coating properties may have the coating harder than the CMC to reduce pressure concentrations in the CMC. The coating may be sprayed to a greater thickness and then ground down.

With reference back to FIG. 4, the base structure 84 is held together in one example by an overwrap layer 86. In this example, the overwrap layer 86 is provided by either a single CMC sheet or a plurality of layered CMC sheets defining a single overwrap layer 86. In another example, the overwrap layer 86 may be provided using a PIP, CVI or CVD process.

With continued reference to FIG. 4, and with additional reference to FIG. 8 (which illustrates the overwrap layer 86 in a laid-out state), the overwrap layer 86 includes a central body portion 214 (FIG. 8) having a plurality of flaps and projections extending therefrom. When formed, the central body portion 214 forms a radially innermost layer of the BOAS segment. The overwrap layer may be initially formed oversized in some locations and then machined down after a consolidation step to then form the final shape of the BOAS segment.

For example, the central body portion 214 includes a first pair of projections 216A, 218A which provide overwrap at the first end portion 95A. The overwrap layer similarly includes a pair of projections 216B, 218B which provide overwrap at the second end portion 95B. In one example, the overwrap layer 86 is bent about a first pair of bends B1 to position the projections 216A, 216B, 218A, 218B relative to end portions of the base structure 84.

The overwrap layer further includes a fore flap 224 and an aft flap 226 extending from the central body portion 214. When the overwrap layer is bent about a pair of second bends B2, the fore and aft flaps 224, 226 provide fore and aft surfaces of the BOAS segment 74, respectively. The overwrap layer 86 may include a plurality of primary fibers extending in a direction substantially parallel to the first and second pairs of bends B1, B2 to increase the ease of folding the overwrap layer 86.

Projections 228A, 230A extend from the fore and aft flaps 224, 226, respectively, to fall along a first end of the well 100. The fore and aft flaps also include another pair of projections 228B, 230B which fall along a second end of the well 100. A third, relatively larger pair of projections 236, 238 are provided between the projections 228A, 228B and 230A, 230B and wrap back down to form fore and aft surfaces of the well 100.

The projections of the overwrap layer 86 urge the base structure 84 against the central body portion 214 of the overwrap layer 86. In the example where the base structure 84 is made of layered CMC sheets, the overwrap layer 86 provides an effective cap over the edges of the sheets to prevent delamination. Accordingly, the overwrap layer 86 securely holds the base structure 84 intact, against the central body portion 214. By virtue of the discussed arrangement, the overall BOAS segment 74 is relatively strong, lightweight, and temperature resistant.

Manufacture and use may otherwise correspond to the methods of the '645 and '268 publications.

FIG. 5 shows a second layer 320 of the BMAS-containing material. The layer is used as a bondcoat to transition from the CMC to a ceramic barrier coat 330 (e.g., thermal barrier coat). An exemplary layer 320 and barrier coat are along the ID surface of the BOAS segment. Exemplary barrier coats are one or multiple layers of one or more yttria stabilized zirconia (YSZ) and/or gadolinia stabilized zirconia (GSZ) potentially with various additional additives. Various vapor deposition (e.g., electron beam physical vapor deposition (EBPVD)) or spray techniques may be used for the barrier layer.

FIG. 5 also shows the BMAS-containing material 340 used to mount a device such as a thermocouple 342 (e.g., having leads 344) to the CMC.

Exemplary application techniques for the BMAS-containing material involve applying a precursor slurry such as dipping, painting, air spraying, and ultrasonic spraying.

The slurry is a precursor slurry to the extent that it comprises components of the hafnium silicate and/or ytterbium disilicate which are reacted post spraying. The examples below include the BMAS in the slurry. Exemplary slurries are aqueous slurries where the carrier is distilled or deionized water. The exemplary components for subsequent reacting include silicon and carbon in the form of silicon carbide along with an oxide of the hafnium or ytterbium (respectively hafnium oxide ($HfO_2$) or ytterbium oxide ($Yb_2O_3$). A post spray heating reacts the silicon carbide with the oxide to form the hafnium silicate and/or ytterbium disilicate. The heating is performed in an oxidizing atmosphere (e.g., containing pure oxygen, air, or a mixture) to provide the additional required oxygen for the reaction (e.g., $HfO_2+SiC+2O_2 \rightarrow HfSiO_4+CO_2$).

Exemplary post spray heating is to a temperature of about 2700° F. (1482° C.) more broadly, a range may be at least 1350° C.) at least 2500° F. (1371° C.) or at least 1400° C. or at least 1450° C. or an exemplary 2500° F. (1371° C.) to 2700° F. (1482° C.) or 1350° C. to 1500° C. Exemplary time may be at least 12 hours or an exemplary 4-48 hours, more particularly 12-30 hours or about 24 hours.

The slurries may be prepared by mixing powders of the constituents in the carrier liquid. Tables I&II below provide exemplary ranges of constituents.

TABLE I

| Constituent | Powder size | Range 1 | | Range 2 | | Example 1 | | Example 2 | | Example 3 | |
|---|---|---|---|---|---|---|---|---|---|---|---|
| | | Wt % | Vol %* | Wt % | Vol*% | Wt % | Vol %* | Wt % | Vol %* | Wt % | Vol %* |
| $HfO_2$ | 1-2 um | 35-60 | 40-60 | 30-70 | 40-80 | 55 | 61 | 49 | 61 | 40 | 45 |
| SiC | 1-2 um | 5-20 | 30-50 | 5-20 | 15-55 | 10 | 35 | 9 | 33 | 15 | 50 |
| BMAS | −325 mesh (<45 um) | 1-10 | 5-20 | 0.1-10 | 1-20 | 1 | 5 | 2 | 10 | 1 | 5 |
| $H_2O$ | N/A | ~40 | 75-85 | ~40 | 75-85 | 46 | 83 | 42 | 80 | 40 | 83 |

*Volume percent of particulates does not include the carrier (water) in the denominator.

TABLE II

| Constituent | Powder size | Range 1 Wt % | Range 1 Vol %* | Range 2 Wt % | Range 2 Vol*% | Example 1 Wt % | Example 1 Vol %* | Example 2 Wt % | Example 2 Vol %* | Example 3 Wt % | Example 3 Vol %* |
|---|---|---|---|---|---|---|---|---|---|---|---|
| $Yb_2O_3$ | 1-2 um | 35-60 | 40-60 | 30-70 | 40-80 | 40 | 45 | 48 | 63 | 56 | 78 |
| SiC | 1-2 um | 5-20 | 30-50 | 5-20 | 15-55 | 15 | 50 | 9 | 33 | 4 | 18 |
| BMAS | −325 mesh (<45 um) | 1-10 | 5-20 | 0.1-10 | 1-20 | 1 | 5 | 1 | 5 | 1 | 5 |
| $H_2O$ | N/A | ~40 | 75-85 | ~40 | 75-85 | 46 | 83 | 42 | 80 | 40 | 83 |

*Volume percent of particulates does not include the carrier (water) in the denominator Table III below shows test data discussed below. Cracking and delamination are observed at at high ratio of Yb to Si. Some cracking but no significant delamination occurred at lesser ratio and it is believed this may be ameliorated via variation in coating thickness. Coatings were about 300-400 micrometers.

TABLE III

| | Test 1 | Test 2 | Test 3 | Test 4 | Test 6 |
|---|---|---|---|---|---|
| Reactive element (RE) | Hf | Hf | Yb | Yb | Yb |
| Molar RE/Si | 0.5 | 1.0 | 1.0 | 2.6 | 0.5 |
| Wt. % BMAS | 7 | 5 | 5 | 5 | 5 |
| Result | No cracking or delamination | Cracking and no delamination | No cracking or delamination | Cracking and delamination | Cracking and no delamination |

Exemplary molar ranges of Hf, Yb, or their combination to Si are 0.5-2.0, more particularly 0.5-1.5.

Exemplary application is via AccuMist™ Spray Shaping System of Sono-Tek Corporation, Milton N.Y.

In an exemplary test for resistance to calcium magnesium aluminosilicate (CMAS) attack, a sample of the coating material on a CMC substrate was prepared by initially marking out a 1 cm by 1 cm square on the coating and applying 0.010 g of CMAS powder via sprinkling onto that marked area. A spatula was used to spread the powder over the area and then 2-5 drops of isopropanol was applied to the powder (until powder appeared fully wetted). The spatula was used to mix and evenly distribute the CMAS-isopropanol slurry.

The sample was allowed to air dry for a few minutes and then placed in a crucible and covered. The crucible is placed in a furnace and heated at a desired temperature (2700F in the tests) for a desired time (100 hours).

The post heating samples were observed to detect the presence of spalling (Table III above).

The results for the examples above were that a beneficial range of BMAS is 1.0% to 10.0%, more particularly, 1.0% to 8.0% or 2.0% to 7.0%. Lower amounts are believed to hinder densification, exposing the substrate to greater oxidation and exposing the coating to greater CMAS infiltration; greater amounts are believed to increase chances of adverse reaction between the BMAS and the silicon carbide of the substrate.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. An article comprising:
    a substrate; and
    a layer atop the substrate comprising:
        a matrix comprising at least one of hafnium silicate ($HfSiO_4$) and ytterbium disilicate ($Yb_2Si_2O_7$); and
        barium magnesium alumino silicate (BMAS), the layer having a thickness of 0.05 mm to 0.50 mm and a BMAS concentration of 0.8% to 10.0% by weight.

2. The article of claim 1 wherein:
the substrate comprises a ceramic matrix composite.

3. The article of claim 2 wherein:
the ceramic matrix composite is a SiC/SiC ceramic matrix composite.

4. The article of claim 1 wherein:
the article is a blade outer airseal and the layer is along an inner diameter (ID) surface of the blade outer airseal.

5. The article of claim 1 wherein:
the layer is directly atop the substrate.

6. The article of claim 1 wherein:
the layer is an outermost layer.

7. The article of claim 1 wherein:
the layer is an intermediate layer between the substrate and a ceramic layer.

8. The article of claim 1 wherein:
the layer adheres an object in a hole in the substrate.

9. The article of claim 1 wherein:
the layer covers an area of at least 4.0 $cm^2$.

10. The article of claim 1 wherein:
the layer adheres an object to the substrate.

11. The article of claim 10 wherein:
the object is a thermocouple.

12. The article of claim 1 wherein:
the layer comprises said hafnium silicate ($HfSiO_4$).

13. A gas turbine engine including the article of claim 1.

14. The gas turbine engine of claim 13 wherein:
the article is a blade outer air seal.

15. A method for using the article of claim 1, the method comprising:
exposing the article to a calcium magnesium aluminosilicate (CMAS)-forming environment.

16. A method for manufacturing the article of claim 1 by applying the layer to the substrate, the method comprising:
applying a combination of:
at least one of hafnium oxide ($HfO_2$) and ytterbium oxide ($Yb_2O_3$);
silicon carbide (SiC); and
barium magnesium aluminosilicate (BMAS); and
heating to react the at least one of hafnium oxide ($HfO_2$) and ytterbium oxide ($Yb_2O_3$) with the silicon carbide (SiC) to form the least one of hafnium silicate ($HfSiO_4$) and ytterbium disilicate ($Yb_2Si_2O_7$).

17. The method of claim 16 wherein:
the applying is of one or more slurries.

18. The method of claim 17 wherein:
a weight content of the BMAS relative to total combined $HfO_2$, $Yb_2O_3$, SiC, and BMAS in the one or more slurries is 0.8% to 10.0%.

19. The method of claim 17 wherein:
the applying is via ultrasonic spray.

20. The method of claim 16 wherein:
the heating is in an oxidizing environment; and
the heating is to a peak temperature of at least 1450° C.

* * * * *